US006766357B1

(12) United States Patent
Fandozzi (10) Patent No.: US 6,766,357 B1
(45) Date of Patent: Jul. 20, 2004

(54) APPARATUS AND METHOD FOR EFFICIENT TRANSFER OF MULTIMEDIA DATA FOR PLAYBACK

(75) Inventor: Michael A. Fandozzi, Merrimack, NH (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/293,502

(22) Filed: Apr. 15, 1999

(51) Int. Cl.[7] .......................................... G06F 15/167
(52) U.S. Cl. ........................................ 709/213; 725/32
(58) Field of Search ................................ 709/213, 219; 725/32, 39, 56

(56) References Cited

U.S. PATENT DOCUMENTS

| 5,038,211 A |   | 8/1991  | Hallenbeck            |
|-------------|---|---------|-----------------------|
| 5,045,940 A |   | 9/1991  | Peters et al.         |
| 5,117,497 A | * | 5/1992  | Kanamori et al. ............ 717/3 |
| 5,197,047 A | * | 3/1993  | Witheridge et al. ............ 369/4 |
| 5,499,046 A | * | 3/1996  | Schiller et al. ............ 725/145 |
| 5,574,913 A | * | 11/1996 | Ohtsu ........................ 712/220 |
| 5,577,258 A |   | 11/1996 | Cruz et al.           |
| 5,581,530 A |   | 12/1996 | Iizuka et al.         |
| 5,649,046 A |   | 7/1997  | Stewart et al.        |
| 5,652,613 A |   | 7/1997  | Lazarus et al.        |
| 5,706,486 A |   | 1/1998  | Cruz et al.           |
| 5,715,018 A |   | 2/1998  | Fasciano et al.       |

(List continued on next page.)

FOREIGN PATENT DOCUMENTS

| EP | 0601 749 A1  | 6/1994  |
|----|--------------|---------|
| EP | 0615 244 A2  | 9/1994  |
| EP | 0644 545 A2  | 3/1995  |
| EP | 0715 460 A1  | 6/1996  |
| EP | 0753852      | 1/1997  |
| EP | 0774756      | 5/1997  |
| EP | 0801 391 A2  | 10/1997 |
| EP | 0801391      | 10/1997 |
| EP | 0803873      | 10/1997 |
| EP | 0847 055 A2  | 6/1998  |
| WO | WO97/39411   | 10/1997 |
| WO | WO98/45792   | 10/1998 |
| WO | WO99/05821   | 2/1999  |
| WO | WO99/34291   | 7/1999  |
| WO | WO 99/52114  | * 10/1999 ......... G11B/27/034 |

OTHER PUBLICATIONS

U.S. patent application Ser. No. 09/054,868, Sacilotto et al., filed Apr. 3, 1998.
U.S. patent application Ser. No. 08/832,872, Paigen, filed Apr. 4, 1997.
Burghardt, J., "Das Sony –News–System," Ein vollstandig integriertes System zur Erstellung con Nachrichtensendungen in Fernsehen, XP 000641232, Nov. 1996, pp. 641–646.
Groger, H., "Der digitale Newsroom," Das Nachrichtenredaktions system, "Avid News", XP000641234, Nov. 1996, pp. 654–656.
MOS Protocol, Media Object Server Protocol, Proposed 2.02 XML Evolution, Mar. 1999, pp. i–49.

*Primary Examiner*—Bunjob Jaroenchonwanit
(74) *Attorney, Agent, or Firm*—Peter J. Gordon (57) ABSTRACT

A computer system on a computer network with shared storage and that is connected through a network to playback and other systems, enables editing systems using the shared storage to turn over responsibility for transferring data to these playback and other systems. Using information from an automation control system, such as a playlist, indicating the order in which stories are to be played back by a playback system, the computer system schedules the transfer of data to the playback system in an efficient manner. The computer system may maintain a queue of requests to transfer data for programs that is ordered according to the order of the programs in a playlist specified using, for example, broadcast automation control system.

25 Claims, 7 Drawing Sheets

U.S. PATENT DOCUMENTS

| | | |
|---|---|---|
| 5,719,985 A | 2/1998 | Ito et al. |
| 5,793,971 A | 8/1998 | Fujita et al. |
| 5,799,150 A | 8/1998 | Hamilton et al. |
| 5,805,889 A * | 9/1998 | Van De Vanter ............ 717/107 |
| 5,808,628 A | 9/1998 | Hinson et al. |
| 5,819,160 A * | 10/1998 | Foladare et al. ......... 455/186.1 |
| 5,852,435 A | 12/1998 | Vigneaux et al. |
| 5,892,915 A * | 4/1999 | Duso et al. ................. 709/219 |
| 5,905,842 A * | 5/1999 | Kajimoto ..................... 386/52 |
| 5,924,071 A * | 7/1999 | Morgan et al. ............. 369/126 |
| 5,986,979 A * | 11/1999 | Bickford et al. ......... 369/30.09 |
| 5,991,374 A * | 11/1999 | Hazenfield ............ 379/101.01 |
| 5,995,091 A | 11/1999 | Near et al. |
| 6,009,228 A | 12/1999 | Fujita et al. |
| 6,026,368 A * | 2/2000 | Brown et al. ................. 705/14 |
| 6,049,332 A | 4/2000 | Boetje et al. |
| 6,073,727 A * | 6/2000 | DiFranza et al. ........... 187/247 |
| 6,088,703 A * | 7/2000 | Kaneko ................... 707/104.1 |
| 6,091,407 A | 7/2000 | Boetje et al. |
| 6,104,334 A * | 8/2000 | Allport ....................... 341/175 |
| 6,119,144 A | 9/2000 | Fujita et al. |
| 6,141,007 A | 10/2000 | Lebling et al. |
| 6,192,340 B1 * | 2/2001 | Abecassis ................... 704/270 |
| 6,211,869 B1 * | 4/2001 | Loveman et al. ........... 345/723 |
| 6,243,725 B1 * | 6/2001 | Hempleman et al. ....... 707/530 |
| 6,351,765 B1 | 2/2002 | Pietropaolo et al. |
| 6,374,336 B1 | 4/2002 | Peters et al. |
| 6,378,129 B1 | 4/2002 | Zetts |
| 6,446,080 B1 * | 9/2002 | Van Ryzin et al. ........... 707/10 |
| 6,473,902 B1 | 10/2002 | Noritomi |
| 6,489,969 B1 | 12/2002 | Garmon et al. |
| 2001/0013061 A1 * | 8/2001 | DeMartin et al. ........... 709/217 |
| 2002/0002039 A1 * | 1/2002 | Qureshey et al. ........... 455/344 |

\* cited by examiner

APPARATUS AND METHOD FOR EFFICIENT TRANSFER OF MULTIMEDIA DATA FOR PLAYBACK

BACKGROUND

Various computer systems are available for capturing multimedia data, editing and playing back multimedia programs and managing multimedia assets in storage. A computer network may be used to interconnect such computer systems. The computer network may enable the capture, editing and playback systems to share storage devices on which the multimedia data is stored. One system for shared storage is shown in U.S. patent application Ser. No. 09/054,761, filed Apr. 3, 1998, and entitled "Computer System and Process for Transferring Multiple High Bandwidth Streams of Data Between Multiple Storage Units and Multiple Applications in a Scalable and Reliable Manner." To use shared storage, the computer systems sharing the storage typically have the same file system. However, in some installations, a capture or playback device may need to be replaced to change its file system, or commercially available options for the capture or playback device may be limited.

If an editing system and a playback system do not share the same file system, the editing system transfers media data from storage associated with the editing system to storage associated with the playback system. This transfer both consumes resources on the editing system and may result in multiple editing systems sending stories to the playback system. In a broadcast environment, delays in transfer may cause a story to miss its scheduled broadcast time because of a transfer delay.

SUMMARY

A computer system on a computer network with shared storage and that is connected through a network to playback and other systems, enables editing systems using the shared storage to turn over responsibility for transferring data to these playback and other systems. Using information from an automation control system indicating the order in which stories are to be played back by a playback system, the computer system schedules the transfer of data to the playback system in an efficient manner. The computer system may maintain a queue of requests to transfer data for programs that is ordered according to the order of the programs in a playlist specified using, for example, broadcast automation control system.

Accordingly in one aspect, a computer system or computer implemented process for transferring media data from a first storage to a second storage, wherein the first storage is accessible by an editing system for creating programs from the media data and the second storage is accessible by a playback system for displaying the programs, involves receiving data representing a plurality of programs created using the editing system. Data representing a playlist specifying an order of playback of programs by the playback system also is received. Media data for the programs is transferred in an order according to the order of playback of the programs. In one embodiment, a queue of requests to transfer media data of a program is maintained. After receiving data representing a program, a request may be placed in the queue according to a position of the program in the playlist. After receiving data representing a playlist, the requests in the queue may be reordered according to the playlist.

A computer program product including a computer readable medium may have computer program instructions stored thereon such that, when executed by a computer, the computer manages the transfer of media data to a playback system in this manner.

In another aspect, a computer system transfers media data from a first storage to a second storage, wherein the first storage is accessible by an editing system for creating programs from the media data and the second storage is accessible by a playback system for displaying the programs. A transfer queue manager has a first input for receiving data representing a plurality of programs created using the editing system, a second input for receiving data representing a playlist specifying an order of playback of programs by the playback system, and an output providing a transfer queue listing programs in an order according to the order of playback of the programs. A transfer agent has a first input for receiving a selected program from the transfer queue, a first interface for accessing the media data of the selected program from the first storage and a second interface for transferring the media data for the selected program to the second storage. In one embodiment, the transfer queue manager, after data representing a program is received, places the request in the queue according to a position of the program in the playlist. The transfer queue manager, after data representing a playlist is received, also may reorder the requests in the queue according to the playlist.

In another aspect, a computer system for supporting editing and playback of multimedia programs includes a plurality of editing systems for creating programs from the media data interconnected to storage shared by the editing systems. A first computer network connects the editing systems and the shared storage. A playback system for displaying the programs is connected to a transfer management system that is connected between the first network and the playback device. The transfer management system receives data representing a plurality of programs created using the editing system. Media data for the programs is transferred from the shared storage to the playback system. In one embodiment, the transfer management system receives data representing a playlist specifying an order of playback of programs by the playback system. Media data for the programs may be transferred in an order according to the order of playback of the programs by the playback system.

DETAILED DESCRIPTION

The following detailed description should be read in conjunction with the attached drawing in which similar reference numbers indicate similar structures. All references cited herein are hereby expressly incorporated by reference.

Figure 1:
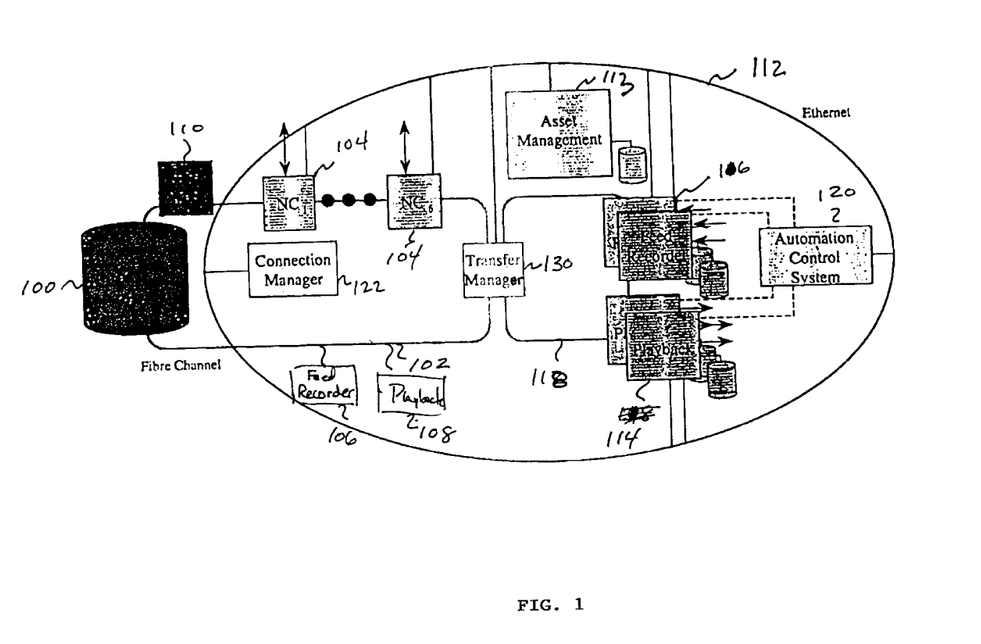
FIG. 1 is a block diagram of a computer system illustrating a transfer manager that transfers data from shared storage to computer systems on another network.

Referring now to FIG. 1, a system for supporting capturing, editing and playback of multimedia data includes a first computer network 102 for interconnecting computer systems using shared storage 100. Example computer systems include editing systems 104, and possibly a capture system 106 or playback system 108. The computer network 102 may be, for example, a fibre channel network. The shared storage may be implemented, for example, using the system described in U.S. patent application Ser. No. 09/054,761 filed Apr. 3, 1998, and entitled, "Computer System and Process for Transferring Multiple Hide Bandwidth Streams of Data Between Multiple Storage Units and Multiple Applications in a Scalable and Reliable Manner," which also describes its interaction with playback and capture systems using the shared storage. Such a shared storage system also includes a catalog manager 110 and an asset management system 113.

A second network 112 interconnects the computer systems on the computer network to enable communications among the users of those computer systems. Control data also may be transferred on the second network 112, whereas media data is transferred on the first network 102. The system also may include one or more playback systems 114 and one or more capture systems 116 that may be connected to a network 118 that is different from the shared storage 100. Example playback devices are available from Tektronix (Profile PDR400) and Pluto Technologies International, Inc. (VideoSpace). Such a configuration may arise where the file system accessible by the capture system 116 or the playback system 114 is different from the file system for the shared storage. A connection manager 122 controls which computer systems may access the network 102.

The system also may include an automation control system 120 for newsroom automation. Such systems are described, for example, in U.S. Pat. No. 5,852,435, issued Dec. 22, 1998, entitled "Digital Multimedia Editing and Data Management System, and in U.S. patent application Ser. No. 08/832,868, filed Apr. 4, 1997, entitled "A Multimedia System with Improved Data Management Mechanisms," U.S. patent application Ser. No. 08/832,872, filed Apr. 4, 1997, entitled "Digital Multimedia Editing and Data Management System," and U.S. patent application Ser. No. 08/832,873, filed Apr. 4, 1997, entitled "Newsroom User Interface Including Multiple Panel Workspaces."

A transfer manager 130 transfers media data between the shared storage 100 and other computers on other computer networks (e.g., network 118). For example, data may be transferred to the playback systems 114, and from the capture system 116 to the shared storage 100. The transfer manager also may transfer media data from the shared storage 100 to shared storage on another network to permit compositions from one editing system to be used by another editing system on a different computer network, or to be accessed by a playback system on another computer network.

In general, the transfer manager 130 receives requests, for example over network 112, to transfer data from editing systems 104 to a playback system 114 or another editing system on another network. To transfer data to a playback system 114, the transfer manager 130 uses information from the automation control system 120, namely a play list, that indicates an order in which stories are scheduled for playback by the playback system 114. The playlist may be received from the automation control system 120 through network 112. The transfer manager 130 may transfer the data to the playback system so that media data already accessible by the playback system is not transferred a second time. Such transfers are described in more detail in U.S. patent application Ser. No. 09/054,868, filed Apr. 3, 1998, and entitled "Multimedia System."

Figure 2:
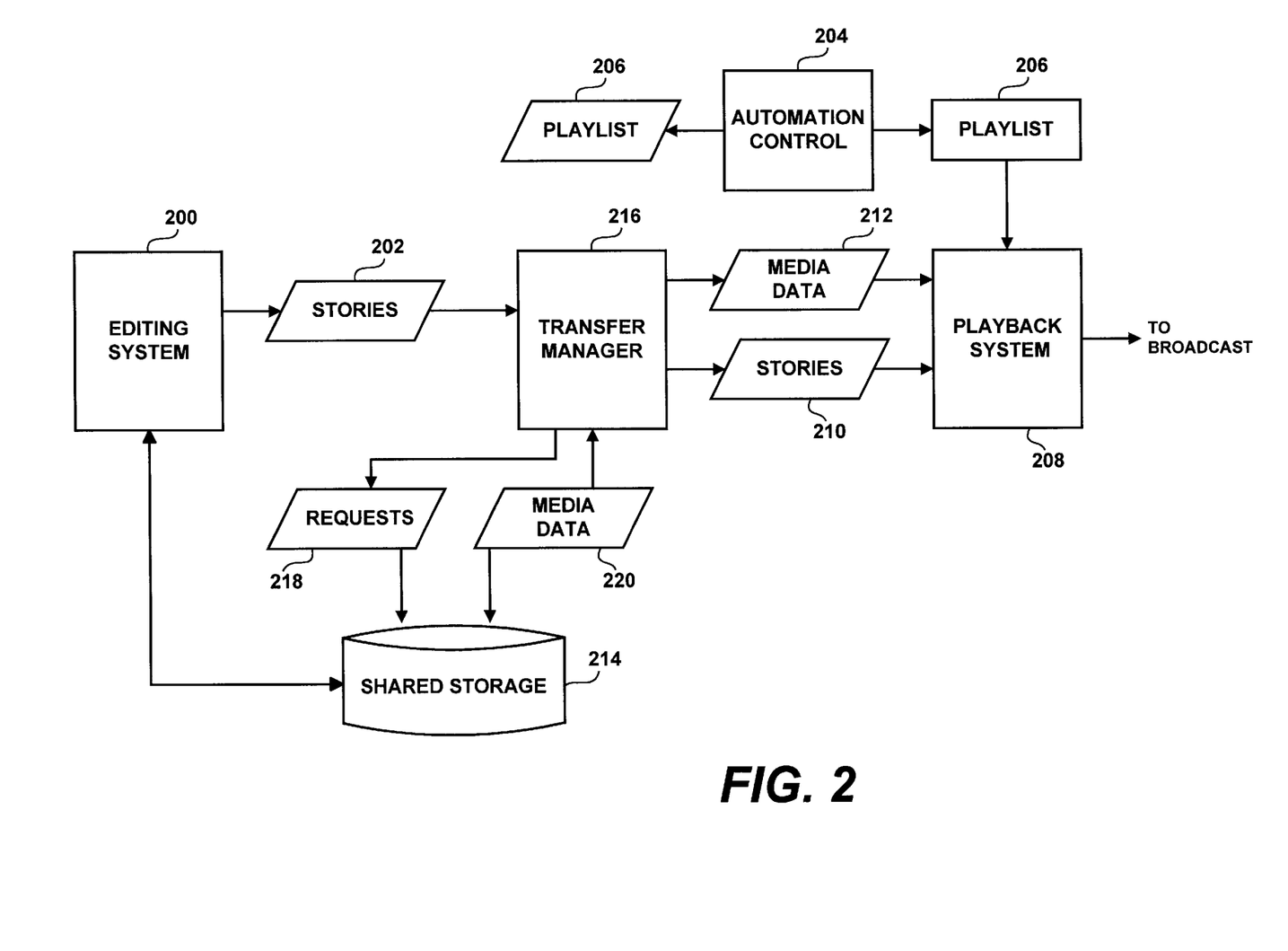
FIG. 2 is a data flow diagram illustrating in general the operation of the system of FIG. 1.

The general operation of the computer network shown in FIG. 1 to produce a broadcast presentation will now be described in connection with the data flow diagram in FIG. 2. In particular, editors using editing systems 200 create stories 202. Another individual, using automation control system 204 specifies a play list 206 that instructs a playback system 208 to playback to broadcast stories 210 in an order specified by the playlist 206. The stories 202 generally are specifications indicating how media data 212 is to be combined to produce the broadcast presentation. Because the playback system 208 does not access the shared storage 214, the editing system 200 instructs the transfer manager 216 to transfer media data from shared storage 214 to the playback system 208. Using the specification provided by stories 202, the transfer manager 216 schedules requests 218 for media data 220 which it receives and transfers as media data 212 to playback system 208. Transfer manager 216 uses the playlist 206 to prioritize requests for transfer of media data 200 to the playback system 208.

The transfer manager may receive the playlist 206 in many ways. For example, the automation control 204 may periodically transfer, or an operator may cause the transfer of, the playlist 206 to the transfer manager 216. Alternatively, the transfer manager 216 may periodically request the playlist 206. The playback system may receive the playlist 206 in a similar manner. The stories 202 may be transferred by the editing system 200 to the transfer manager 216 under the control of an editor. After completion of editing of a story to be broadcast, the editor instructs the editing system 200 to transfer the story 202 to the transfer manager 216.

Transfer of a selected story has been selected for transfer by the transfer manager 216 to the playback system 208, may be performed in many ways. In particular, the transfer manager identifies the media data used in the story. Requests 218 are issued to the shared storage to retrieve the media data 220 to be sent to the playback system 208. These transfers may be made more efficient by having the playback system 208 communicate to the transfer manager 216 the media data which it already has available in local storage. Media data which is already available to the playback system 208 is not transferred by the transfer manager 216. A process for controlling this transfer of media data for a story is described in more detail in U.S. patent application Ser. No. 09/054,868, filed Apr. 3, 1998, and entitled "Multimedia System."

The playlist may be specified in many ways that allows an identifier for a story to be defined. In general, the playlist may be text-based and is human readable. The playlist also may be called a "rundown." The playlist may be represented, for example, using the media object server (MOS) protocol. MOS version 1.52 may be used. A proposed MOS version 2.02 uses the Extensible Markup Language (XML). In general, the automation control system 204 permits stories to be created with an identifier, sometimes called a Tape ID or Slug ID. The newly created stories are transferred to editing systems 200 where editors create the story. Thus, elements in both the playlist 206 and stories 202 include a Tape ID or Slug ID so that stories may be associated with elements in the playlist 206 by the transfer manager 216.

Stories may be specified in many formats. For example, stories may be specified as an Open Media Framework (OMF) or Advanced Authoring Format (AAF) composition.

In general, a story is a collection of sequences of media data that specifies media data sources and which data from the sources are used.

Figure 3:
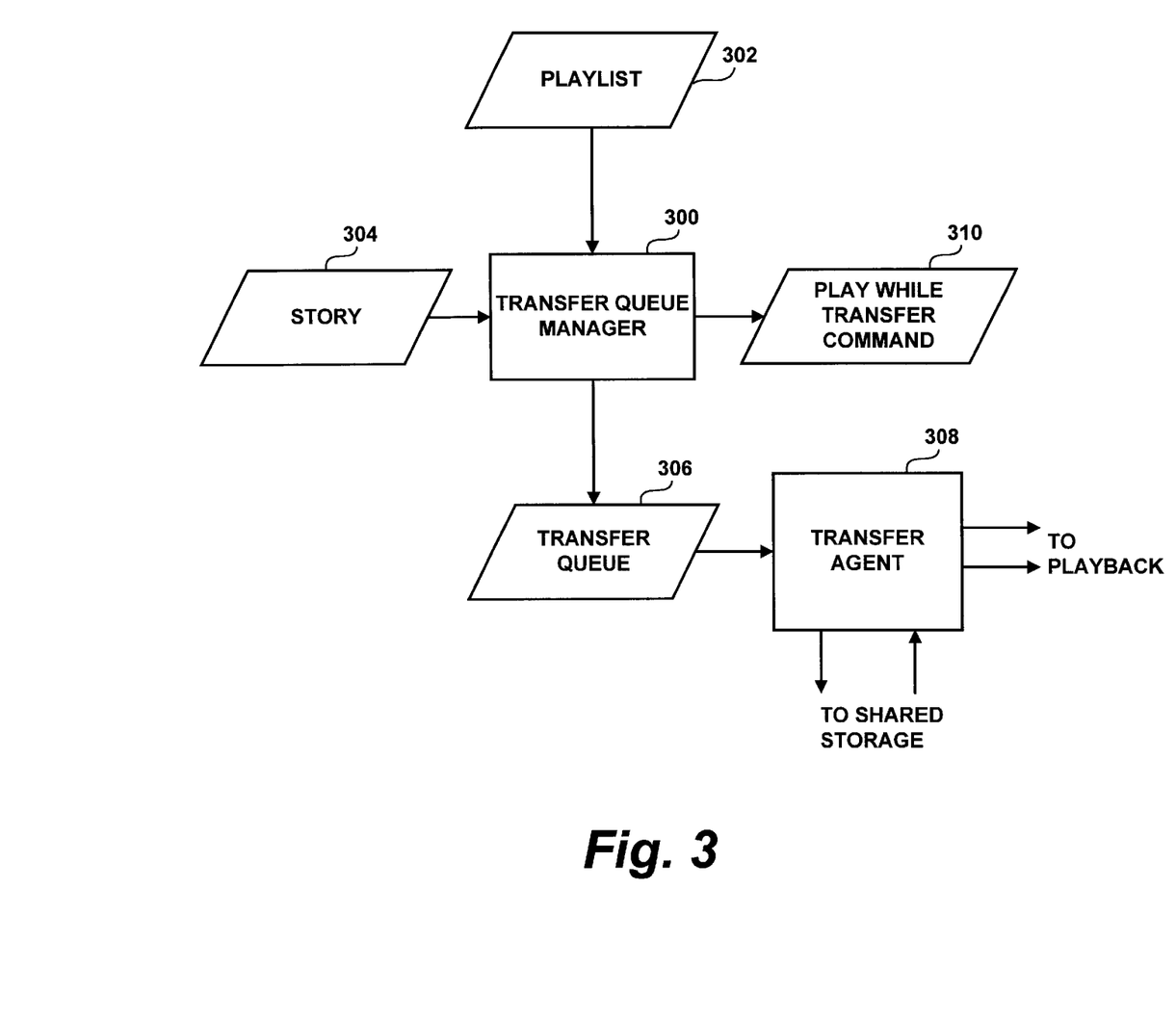
FIG. 3 is a data flow diagram illustrating the operation of the transfer manager in FIG. 2.

A data flow diagram illustrating the operation of the transfer manager in one embodiment will now be described in connection with FIG. 3. The transfer manager includes a transfer queue manager 300 which receives the playlist 302 and story 304 from which a transfer queue 306 is created. A queue may be represented in many ways, such as an array, linked list, double link list, etc. Stories in the transfer queue are ordered according to their appearance in the playlist 302 by the transfer queue manager 300, in a manner to be described in more detail below. The transfer agent 308 selects the top story in the queue 306 for transfer to a playback system. A story may be played wile it is being transferred. An editor may indicate that a story should be transferred with this level of priority to the transfer queue manager 300, for example, when the story 304 is submitted to the transfer manager or through a later instruction by the editor or another individual. For stories having this level of priority, a play while transfer command 310 is issued to the transfer agent 308 which pauses any current transfer to transfer the high priority story.

It also should be understood that the transfer manager may include other transfer queues to transfer data between different storage systems, and to transfer data from a capture system into a storage system. In general, such transfer queues for capture or transfer of data among storage and other systems generally is not controlled by a playlist.

In the example shown in FIG. 1, the transfer manager is presumed to have access to all of the media data for the composition in shared storage, and that the playback device can play the media data in the composition. Accordingly, the editing system may transfer any story using any media data from shared storage to the playback devices. Alternatively, combinations of media within a composition or special effects, or other operations on the media may be rendered to create a rendered version of the composition. The rendered version of the composition may be stored on the shared storage and used for the transfer manager.

An editing system may request the transfer manager to provide information about the capabilities of a playback system connected to the transfer manager. Such information enables the editing system to determine whether parts of a composition need to be rendered prior to transfer of the story to the playback system. Such information about the playback system may include its operating system, the maximum number of simultaneous transfers it can handle, the maximum video cut rate it can handle, the maximum number of video tracks the device can process, the maximum audio cut rate the device can handle, the maximum number of audio tracks it can process, the television formats it supports, decompression capabilities, sampling rate of the audio, and type of audio processing, such as pop suppression and gain sampling. Other capabilities also may be provided to the editing system.

Figure 4:
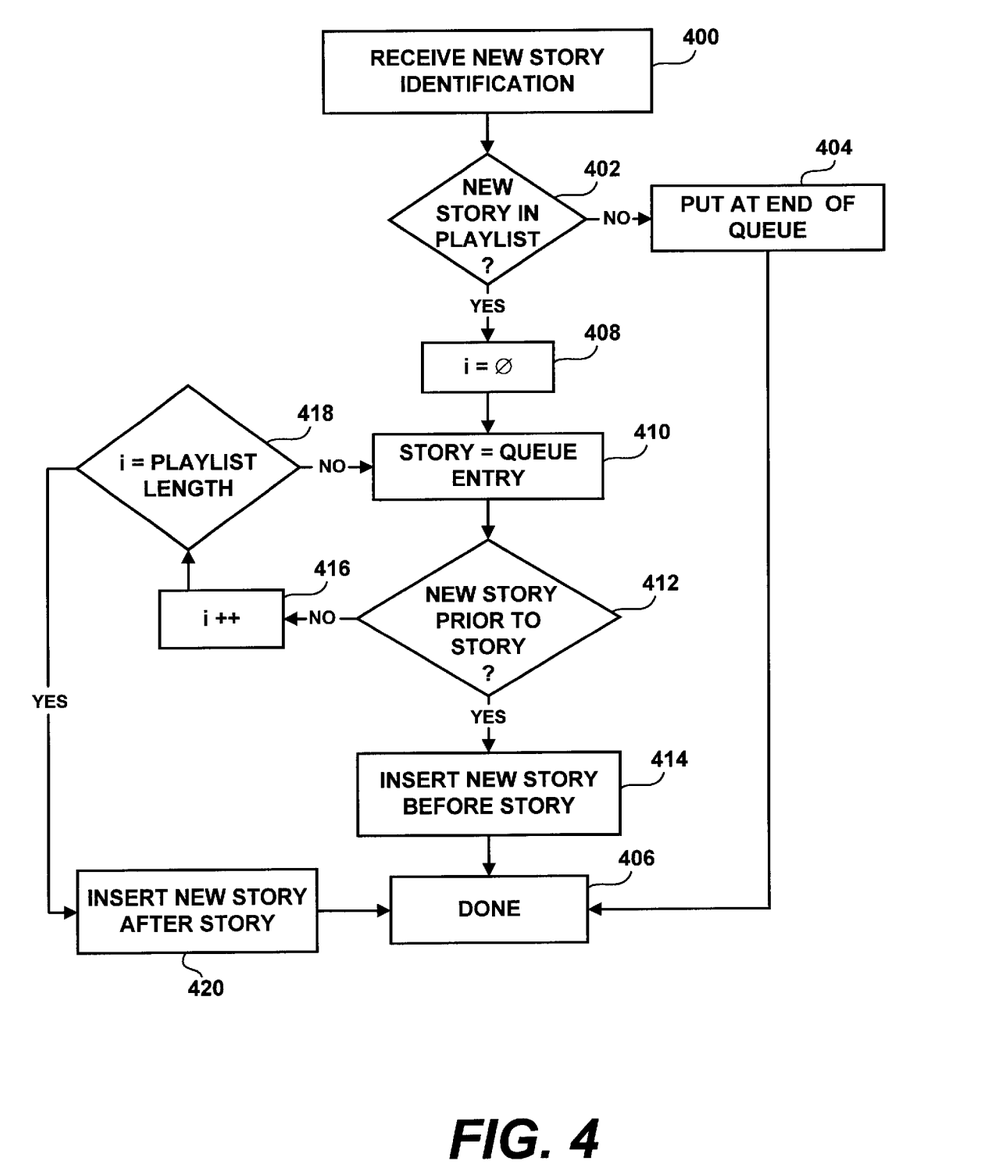
FIG. 4 is a flow chart describing how stories may be added to a transfer queue.

The transfer queue manager 300 updates the transfer queue 306 upon receipt of either a new playlist 302 or a new story 304. Updating the queue given a new story 304 will now be described in connection with the flowchart of FIG. 4. The new story is received in step 400. If the identifier for this new story is not in the playlist, as determined in step 402, the story is placed at the end of the queue in step 404 and this process is completed as indicated in 406. If the new story is in the playlist, a counter "i" is initialized to zero in step 408. A variable "story" is set to the queue entry corresponding to the counter "i" in step 410, herein referred to as the current story. It is then determined whether the new story is prior to the current story in the playlist in step 412. If the new story is prior to this current story, it is inserted before the current story in the queue in step 414 and the process is completed as indicated at 406. Otherwise, the counter is incremented in step 416. If the counter "i" is greater than the queue length, as determined in step 418, the process is completed as indicated in step 406. Otherwise, steps 410–418 are repeated until the same number of entries in the queue as in the playlist are examined.

Figure 5:
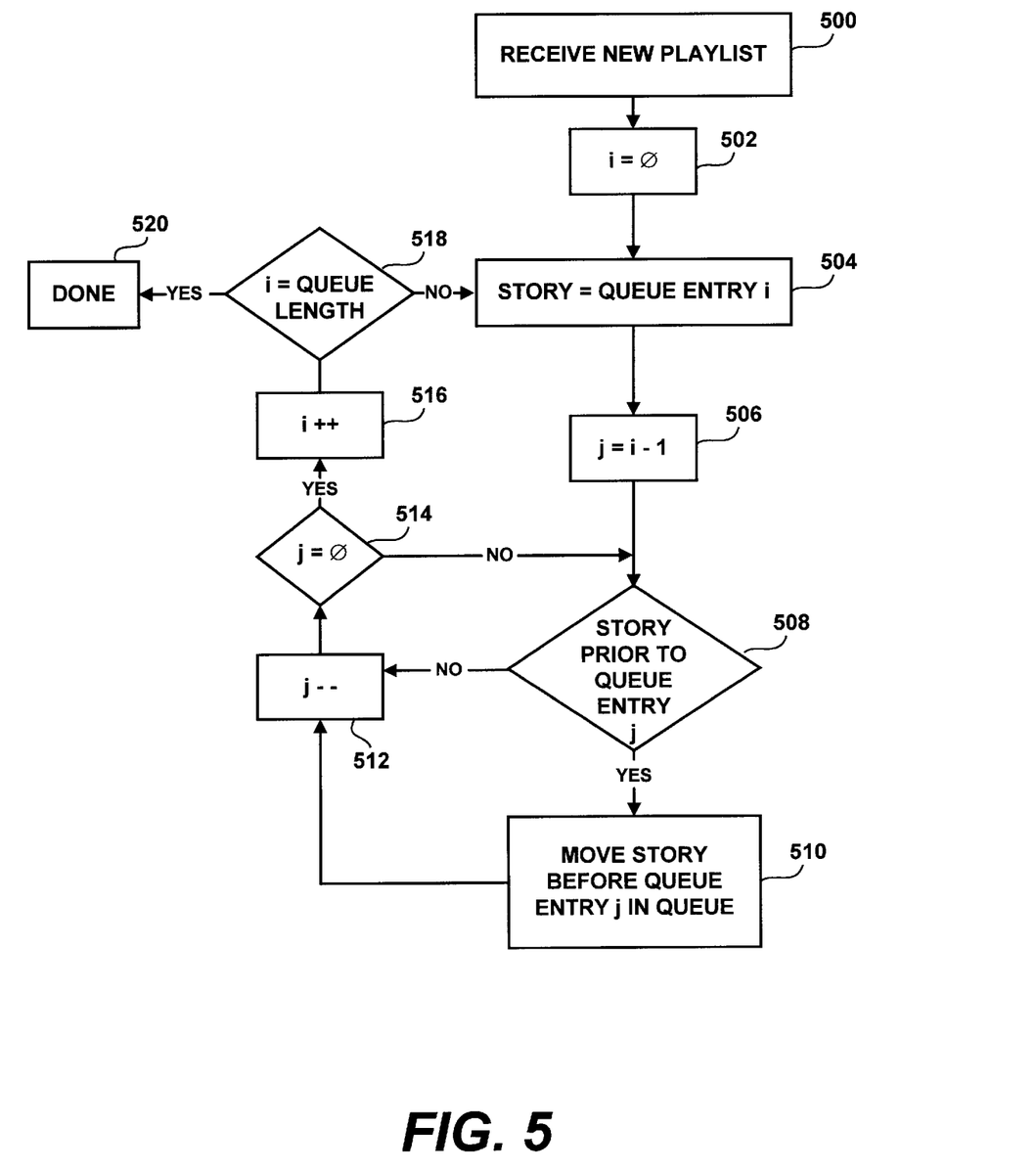
FIG. 5 is a flow chart describing how a transfer queue may be reordered upon receipt of a new playlist.

Referring now to FIG. 5, how a transfer queue is reordered upon receipt of the new playlist will now be described. First the new playlist is received in step 500. A counter "i" is initialized in step 502 to zero. The variable "story" is set to the queue entry corresponding to the counter value set in step 502. This story is referred to as the current story. A second counter "j" is set to the first counter value "i," minus one, in step 506. If the current story is prior to the queue entry "j" as determined in step 508, the current story is moved before the queue entry "j" in the queue in step 510. After steps 508 or 510, the counter "j" is decremented in step 512. If "j" is greater than zero, as determined step 514, steps 508–512 are repeated. If "j" is equal to zero, "i" is incremented in step 516. If "i" has not yet reached the length of the queue, as determined in step 518, steps 504–516 are repeated. If the end of the queue has been reached, the process is completed as indicated in step 520.

Other operations may be performed with respect to the transfer queue. For example, the transfer queue may include status information which may be requested for a specific entry in the queue. If the editing system is provided with a transaction identifier for each transfer request issued to the transfer queue, a specific entry in the queue may be accessed to request status, to cancel it, or to change its priority for transfer to playback. A list of all current pending transactions also may be requested. As transfers are requested, canceled, or priorities changed, or as transfers are executed, such transfer activity may be logged in a log file. This log file may be made available to other systems on the network.

Because the playback system may be dependent upon the transfer manager in order to have media data available at the time it should be broadcast, some fail recovery mechanism may be used in the transfer manager. For example, the transfer manager may periodically store to persistent storage the current state of its transfer queue. Transfer manager may be implemented using a fail-safe computer system.

Figure 6:
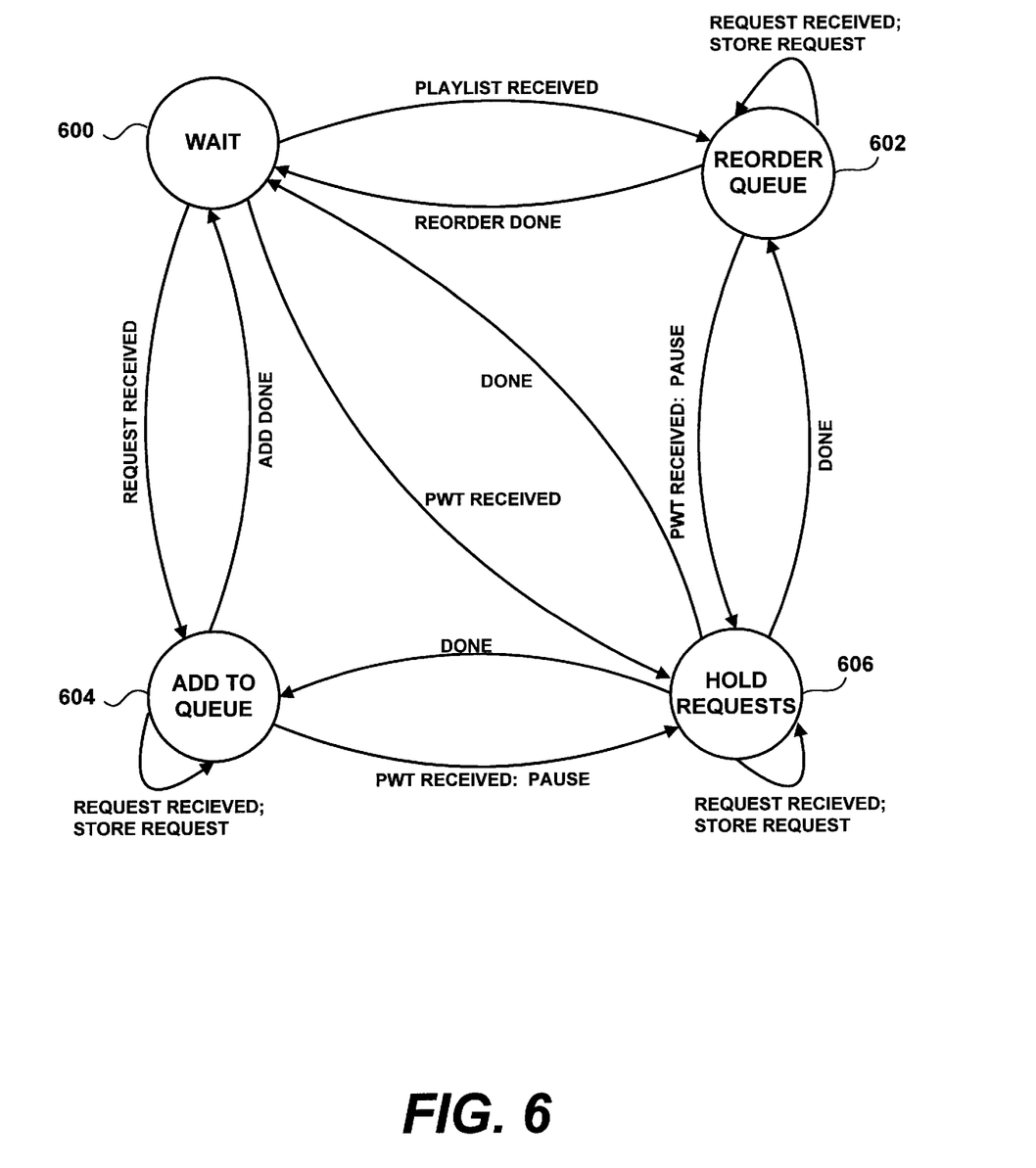
FIG. 6 is a state diagram of the transfer queue manager in FIG. 3.

Referring now to FIG. 6, a simplified state diagram for the queue manager will now be described. The queue manager generally is in a wait state 600 until a transaction request is received. The state diagram illustrates states for receiving a request to add to the queue, receiving a new playlist, and receiving a play while transfer (pwt) request. After the playlist is received, a flag is set for the queue to prevent entries from being read from the queue. The queue is then reordered in state 602 in the manner described above in connection with FIG. 5. After the queue is reordered, the flag is cleared and a transition back to state 600 occurs. If a request is received to add an entry to the queue, the flag is set to block access to the queue and a transition to state 604 occurs. In state 604, the story is added to the queue in the manner described above in connection with FIG. 4. Upon completion, the flag is cleared and a transition back to the wait state 600 occurs. If the queue manager is in any of the states 600, 602 and 604, and if a play while transfer (PWT) request is received, all further requests are held in state 606. No operation is performed on the queue. Any current operation, such a reordering the queue or adding an entry to the queue is paused. After the play while transfer (PWT) request is completed, a transition occurs back to the state from which the transition was made.

Figure 7:
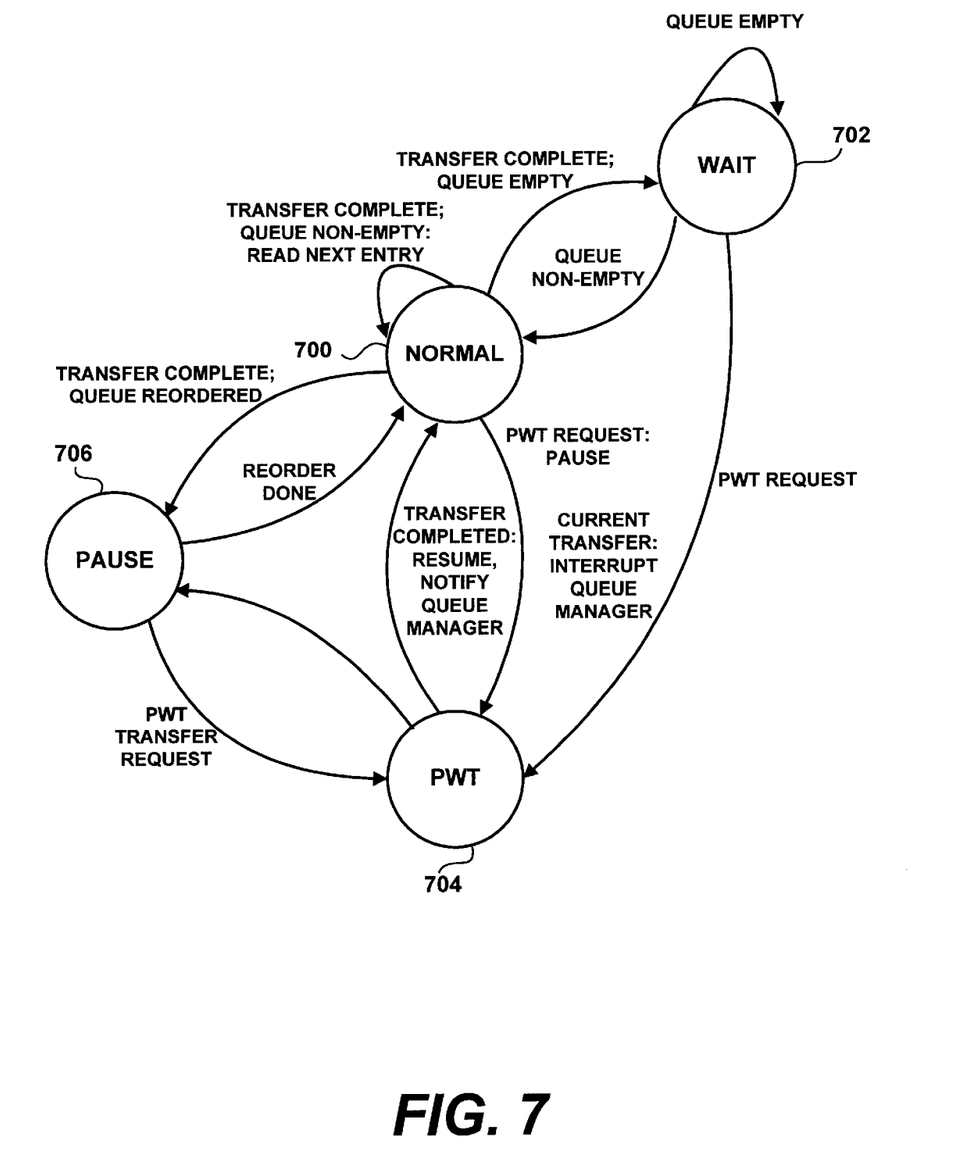
FIG. 7 is a state diagram of the transfer agent in FIG. 3.

Referring now to FIG. 7, an example state diagram for a transfer agent will now be described. If the transfer queue is non-empty, the transfer agent is in a normal state 700. In the normal state, after a transfer completes, the next entry from the queue is read and transferred to the playback system. If the queue is empty, a transition is made to a wait state 702. If the queue becomes non-empty, a transition is made back to the normal state 700. If in either the normal state or the wait state, if a play while transfer request is received, a transition is made to state 704 to process the play while transfer request. On a transition from the normal state, any current transfer is paused and the queue manager is notified so that any queue operations may be interrupted. Upon completion of the play while transfer request, any interrupted transfer may be resumed and the queue manager may be notified in a transition back to the normal state 700. If the queue is empty, a transition could occur back to the wait state 702. If the transfer agent is in the normal state 700, and if an operation is being performed on the queue by the queue manager, a transition to a pause state 706 may occur. The transition generally does not occur until the currently performed transfer is completed. A play while transfer request may occur while the transfer agent is in state 706. If such a request occurs, a transition from state 706 to 704 occurs to handle the requested transfer.

It should be understood that the transfer manager may have a transfer queue for each playback device to which it may transfer data. Each playback device may have its own playlist. Alternatively, there may be one transfer queue and one playlist for multiple playback devices.

By ordering the entries in the queue by their priority as specified in a playlist, a delay in transfer of an important story to a playback device is less likely to occur. The use of the transfer manager also removes processing from the editing system, which then enables an editor to continue working on new stories while a completed story is transferred back to the playback device.

The transfer manager may be implemented as a computer program executed on a general purpose computer connected to both of the computer networks. In particular, the computer supporting the transfer manager may have one network interface connected to the first network 102 (FIG. 1) and another network interface connected to the second network 118. In the embodiment shown in FIG. 1, the first network interface is a fibre channel network interface permitting communication with shared storage. The second network interface may communicate using a standard network communication protocol, such as TCP/IP, with the playback device.

A computer system for implementing the transfer manager as a computer program may include a main unit connected to both an output device which displays information to a user and an input device which receives input from a user. The main unit may include a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD) and other video output devices, printers, communication devices such as a modem, storage devices such as disk or tape. and audio output. It should also be understood that one or more input devices may be connected to the computer system. Example input devices include a keyboard, keypad, track ball, mouse, pen and tablet, communication device, and data input devices such as audio and video capture devices. It should be understood that the invention is not limited to the particular input or output devices used in combination with the computer system or to those described herein.

The computer system may be a general purpose computer system which is programmable using a computer programming language, such as "C++," JAVA or other language, such as a scripting language or even assembly language. An example computer system is the Intellistation M Pro computer system from International Business Machines, Inc. The computer system may also be specially programmed, special purpose hardware, or an application specific integrated circuit (ASIC). In a general purpose computer system, the processor is typically a commercially available processor, of which the series x86 and Pentium series processors, available from Intel, and similar devices from AMD and Cyrix, the 680X0 series microprocessors available from Motorola, the PowerPC microprocessor from IBM and the Alpha-series processors from Digital Equipment Corporation, and the MIPS microprocessor from MIPS Technologies are examples. Many other processors are available. Such a microprocessor executes a program called an operating system, of which WindowsNT, Windows 95 or 98, IRIX, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the. three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that invention is not limited to a particular computer platform, particular processor, or particular high-level programming language. Additionally, the computer system may be a multiprocessor computer system or may include multiple computers connected over a computer network. It should be understood that each module or step shown in the accompanying figures may correspond to separate modules of a computer program, or may be separate computer programs. Such modules may be operable on separate computers.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer system for transferring media data from a first storage to a second storage, wherein the first storage is accessible by an editing system for creating programs from the media data stored on the first storage and the second storage is accessible by a playback system for displaying the programs using media data stored on the second storage, comprising:

means for receiving one or more requests from the editing system to transfer media data for a program stored on the first storage to the second storage, wherein the program was created using the editing system;

means for receiving a playlist specifying an order of playback of programs by the playback system; and means for transferring the media data for the programs requested for transfer by the editing system from the first storage to the second storage in an order according to the order of playback of the programs in the playlist.

2. The computer system of claim 1, further comprising:

means for maintaining a queue of the one or more requests from the editing system to transfer media data of a program from the first storage to the second storage.

3. The computer system of claim 2, wherein the means for maintaining the queue comprising:

means, responsive to receipt of a request from the editing system, for placing the request in the queue according to a position of the program corresponding to the request in the playlist.

4. The computer system of claim 2, wherein the means for maintaining the queue conprises:

means, responsive to receipt of the playlist, for reordering the one or more requests in the queue according to the playlist.

5. The computer system of claim 1, wherein, if a program requested to be transferred is not in the playlist, then the means for transferring the media data transfers the media data for the program not in the playlist after transferring media data for programs in the playlist.

6. A computer program product for transferring media data from a first storage to a second storage, wherein the first storage is accessible by an editing system for creating programs from the media data stored on the first storage and the second storage is accessible by a playback system for displaying the programs using media data stored on the second storage, comprising:

a computer readable medium;

computer program instructions stored on the computer readable medium such that, when executed by a computer, the computer performs a process comprising:

receiving one or more requests from the editing system to transfer media data for a program stored on the first storage to the second storage, wherein the program was created using the editing system;

receiving a playlist specifying an order of playback of programs by the playback system; and transferring the media data for the programs requested for transfer by the editing system from the first storage to the second storage in an order according to the order of playback of the programs in the playlist.

7. The computer program product of claim 6, wherein the process performed by the computer executing the computer program further comprises:

maintaining a queue of the one or more requests from the editing system to transfer media data of a program from the first storage to the second storage.

8. The computer program product of claim 7, wherein maintaining the queue comprises:

after a request is received from the editing system, placing the request in the queue according to a position of the program corresponding to the request in the playlist.

9. The computer program product of claim 7, wherein maintaining the queue comprises:

after the playlist is received, for reordering the one or more requests in the queue according to the playlist.

10. The computer program product of claim 6, wherein, if a program requested to be transferred is not in the playlist, then the media data for the program not in the playlist are transferred after media data for programs in the playlist are transferred.

11. A computer-implemented process for transferring media data from a first storage to a second storage, wherein the first storage is accessible by an editing system for creating programs from the media data stored on the first storage and the second storage is accessible by a playback system for displaying the programs using media data stored on the second storage, comprising:

receiving one or more requests from the editing system to transfer media data for a program stored on the first storage to the second storage, wherein the program was created using the editing system;

receiving a playlist specifying an order of playback of programs by the playback system; and transferring the media data for the programs requested for transfer by the editing system from the first storage to the second storage in an order according to the order of playback of the programs in the playlist.

12. The process of claim 11, further comprising maintaining a queue of the one or more requests from the editing system to transfer media data of a program from the first storage to the second storage.

13. The process of claim 12, wherein maintaining the queue comprises:

after a request is received from the editing system, placing the request in the queue according to a position of the program corresponding to the request in the playlist.

14. The process of claim 12, wherein maintaining the queue comprises:

after the playlist is received, reordering the one or more requests in the queue according to the playlist.

15. The computer-implemented process of claim 11, wherein, if a program requested to be transferred is not in the playlist, then the media data for the program not in the playlist are transferred after media data for programs in the playlist are transferred.

16. A computer system for transferring media data from a first storage to a second storage, wherein the first storage is accessible by an editing system for creating programs from the media data on the first storage and the second storage is accessible by a playback system for displaying the programs using media data stored on the second storage, comprising:

a transfer queue manager having a first input for receiving one or more requests from the editing system to transfer media data for a program stored on the first storage to the second storage, wherein the program was created using the editing system, a second input for receiving a playlist specifying an order of playback of programs by the playback system, and an output for providing a transfer queue listing programs requested for transfer by the editing system from the first storage to the second storage in an order according to the order of playback of the programs in the playlist; and a transfer agent having a first input for receiving a selected program from the transfer queue, a first interface for accessing the media data of the selected program from the first storage and a second interface for transferring the media data for the selected program accessed from the first storage to the second storage.

17. The computer system of claim 16, wherein the transfer queue manager, after a request is received from the editing system, places the request in the transfer queue according to a position of the program corresponding to the request in the playlist.

18. The computer system of claim 16, wherein the transfer queue manager, after the playlist is received, reorders the one or more requests in the transfer queue according to the playlist.

19. The computer system of claim 16, wherein, if a program requested to be transferred is not in the playlist, then the transfer queue manager places, in the transfer queue listing, the request to transfer the media data for the program not in the playlist after requests to transfer media data for programs in the playlist.

20. A computer system for supporting editing and playback of multimedia programs, comprising:

a plurality of editing systems for creating programs from media data;

storage shared by the plurality of editing systems for storing the media data used by the plurality of editing systems to create the programs;

a first computer network connecting the plurality of editing systems and the shared storage;

a playback system for displaying the programs using media data stored in second storage accessible by the playback system;

a transfer management system connected to the first network and to the playback system, wherein the transfer management system comprises:

means for receiving one or more requests from the plurality of editing systems to transfer media data for a program stored on the shared storage to the second storage in the playback system, wherein the program was created using the plurality of editing systems;

means for transferring the media data for the programs requested for transfer by the plurality of editing systems from the shared storage to the second storage in the playback system;

means for receiving a playlist specifying an order of playback of programs by the playback system; and wherein the means for transferring transfers the media data for the programs requested for transfer by the plurality of editing systems in an order according to the order of playback of the programs by the playback system in the playlist.

21. The computer system of claim 20, wherein the transfer management system, after receiving a request from one of the plurality of editing systems to transfer media data of a program, places the request in a transfer queue in a position determined according to a position of the program in the playlist.

22. The computer system of claim 20, wherein the transfer management system, after receiving the playlist, reorders the requests in a transfer queue according to the order of playback of programs in the playlist.

23. The computer system of claim 20, wherein if a program is not in the playlist, then the request to transfer media data of the program is placed at the end of a transfer queue.

24. The computer system of claim 20, wherein a command may be issued indicating that media data for a program is to be played back by the playback system during transfer of the media data for the program, wherein the means for transferring comprises:

means, responsive to the command, for pausing any current transfer of media data to the playback system;

means for transferring the program to be played back during transfer; and means for resuming any paused transfer after the transfer of the program to be played back is complete.

25. The computer system of claim 20, wherein a command may be issued indicating that media data for a program is to be played back by the playback system during transfer of the media data for the program, wherein the transfer management system comprises:

means, responsive to the command, for holding all requests to add a request to the transfer queue that arrive subsequent to the command;

means, responsive to the command, for pausing any operation on the transfer queue;

means for waiting for an indication that the transfer of the media data of the program is complete; and means, responsive to the indication that the transfer is complete, for continuing any paused operation and for processing any held requests.

* * * * *